United States Patent
Morlan et al.

(10) Patent No.: US 6,905,178 B1
(45) Date of Patent: Jun. 14, 2005

(54) SPACER FOR A BOOST UNIT

(75) Inventors: William F. Morlan, Granger, IN (US); James V. Reinmann, New Buffalo, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/708,246

(22) Filed: Feb. 19, 2004

(51) Int. Cl.⁷ .............................................. B60T 8/34
(52) U.S. Cl. ..................................... 303/114.3; 92/128
(58) Field of Search .................... 303/113.4, 114.3, 303/115.3; 92/128

(56) References Cited

U.S. PATENT DOCUMENTS

| | | | |
|---|---|---|---|
| 4,269,533 A * | 5/1981 | Mashiki et al. ............. 403/410 |
| 4,567,728 A * | 2/1986 | Ohmi et al. ................ 60/547.1 |
| 4,725,029 A * | 2/1988 | Herve ................... 248/221.12 |
| 4,779,515 A * | 10/1988 | Staub, Jr. ..................... 92/128 |
| 4,779,516 A * | 10/1988 | Parker et al. .................. 92/128 |
| 4,784,046 A * | 11/1988 | Gautier ......................... 92/128 |
| 4,790,235 A * | 12/1988 | Gautier et al. ................ 92/128 |
| 4,798,129 A * | 1/1989 | Staub, Jr. ..................... 92/128 |
| 4,826,121 A * | 5/1989 | Rossigno et al. ........... 248/689 |
| 4,944,479 A * | 7/1990 | Gautier ....................... 248/689 |
| 4,953,446 A | 9/1990 | Fecher et al. |
| 5,233,911 A | 8/1993 | Rossigno |
| 5,487,324 A | 1/1996 | Gautier et al. |
| 6,073,535 A | 6/2000 | Horner et al. |
| 6,481,330 B1 * | 11/2002 | Jakobi et al. ............. 91/376 R |
| 6,719,477 B2 * | 4/2004 | Vermoesen et al. ......... 403/199 |

* cited by examiner

Primary Examiner—Robert A. Siconolfi
(74) Attorney, Agent, or Firm—Leo H McCormick, Jr.; Warren Comstock

(57) ABSTRACT

A spacer for positioned a boost unit in an engine compartment of a vehicle. The spacer is defined by a wall located between a front face and a rear face, bearing surfaces, an axial opening with a flange thereon, ribs that extend from the flange to define a plurality of radial slots, an axial slot that extends from the front face toward the rear face and a peripheral slot that connects the axial slot with the engine compartment. A base of a boot that surrounds a hub on the boost unit engages the front face to define a flow path from the engine compartment to the hub. Tabs on the spacer assure that the front face is aligned with the base while the radial ribs prevent the base from engaging the wall to assure that the size of flow path remains constant during the communication of air to the hub.

5 Claims, 2 Drawing Sheets

SPACER FOR A BOOST UNIT

BACKGROUND OF INVENTION

This invention relates to a spacer for positioning a boost unit for a brake system on a panel that separates an engine compartment from a passenger compartment of a vehicle in a manner to assure the development of a flow path through which air is communicated from an engine compartment and the boost unit.

In brake boosters of a type disclosed in U.S. Pat. No. 4,953,446, pressure differential is created across a wall that separates a vacuum chamber from a control chamber by air communicated from a passenger compartment. The pressure differential acts on the wall to develop an output force corresponding to an input force applied to a control valve. The control valve includes a return spring that urges a plunger toward an atmospheric seat on a poppet member and a seat spring to urge the poppet toward a vacuum seat. The input force is applied to the push rod which compresses the return spring to move the plunger and sequentially allow the seat spring to seat the poppet member on the vacuum seat and the plunger to move away from the poppet member to thereafter allow air to flow to the control chamber. The communication of air through the poppet can create noise during the development of a pressure differential.

In analyzing the operation of brake boosters it was observed that air supplied to a control valve most often is obtained from the passenger compartment of a vehicle. If the sounds caused by the flow of air from the passenger compartment during the operation of a boost unit could be shifted from the passenger compartment to an engine compartment, a passenger would not hear the booster operation. Unfortunately space in the engine compartment is limited and relocating the brake booster within the engine compartment of a vehicle still requires at least a portion of the components that are associated with a brake booster to remain in a passenger compartment of the vehicle.

The structure illustrated in U.S. Pat. No. 5,487,324 disclosed one way whereby air from the engine compartment may be utilized and supplied to a control chamber of a boost unit to develop the pressure differential during a brake application while the bracket member that offsets the housing of the boost unit into the engine compartment disclosed in U.S. Pat. No. 6,073,535 has a resonant chamber whereby noise is further reduced. The structure in U.S. Pat. No. 6,073,535 functions in an adequate manner when a offset distance is sufficient to provide for the inclusion of a resonant chamber but as may often happen the under hood space available for the boost unit may be limited by other structural components in the engine compartment.

In the present invention, a spacer that positions a boost unit away from a dash panel is mated with a boot to define and maintain a substantially uniform flow path through which air from the engine compartment is presented to a bore that retains a valve during the development of an output force in the boost unit to effect a brake application.

SUMMARY OF INVENTION

A primary object of the present invention is to provide a spacer to offset a boost unit into an engine compartment from a panel that separates the engine compartment from a passenger compartment wherein the spacer is defined by slots and ribs some of which are engaged by a base member of a boot to define a flow path between the engine compartment and the bore of the boost unit that has a substantially constant size such that during the development of a brake application the flow of air is not restricted.

According to this invention, a brake system has a boost unit that is secured to a panel of a vehicle that separates an engine compartment from a passenger compartment. The boost unit has a housing that is separated into a front chamber and a rear chamber by a movable wall connected to a valve body. The valve body has a cylindrical projection that extends through a first opening in the housing into the passenger compartment while a boot that is attached to the panel surrounds the opening and is secured to an input rod for the control valve. A valve that is located within a bore of the valve body is responsive to an input force applied to the input rod for selectively communicate air from the engine compartment to the rear chamber of the housing by way of the bore for creating a pressure differential across a movable wall in the boost unit. The pressure differential that develops acts on the movable wall to produce an output force that is supplied to a master cylinder in effecting a brake application. The boost unit is off-set from the panel into the engine compartment by a spacer that is located between the panel and the boost unit. The length of the off-set may vary depending on an application of the boost unit but may be as much as two inches but more often would be about one inch. The spacer is defined by a body having a front face and a rear face created by a first side, a second side, a top side, and a bottom side. The body has a plurality of circular bearing surfaces that are located at an intersection of the sides with an axial bore that extends through each bearing surface for receiving a mounting bolt that extends from the boost unit. A wall located between the front face and the rear face extends between the first side, second side, top side and bottom side. The wall has an axial opening with a flange that extends to a height that is parallel with the front face and a plurality of ribs that extend from the flange toward the sides to define a plurality of radial slots. The body has an axial slot that extends from the front face to the rear face and a peripheral slot adjacent the rear wall through which the axial slot is connected to the engine compartment. The boot has a base member that is joined to an end member by an accordion shaped body. The accordion shaped body surrounds the cylindrical projection of the valve body while the input rod extends through and is sealed with respect to the end member. The base member engages the front face of the spacer and is compressed by the first side, second side, top side, bottom side and circular bearing surface of the spacer body when fasteners are connected to the mounting bolts such that unrestricted communication of air from the engine compartment to the bore of the valve body occurs along a flow path defined by the peripheral slot, axial slot, plurality of radial slots in the spacer and an axial space between the accordion shaped body of the boot and cylindrical projection of the valve body. A plurality of tabs located in an axial bore of at least one of the bearing surfaces are directed toward the axis of the axial bore and the front face such that on engaging a mounting stud of the boost unit the tabs radially flex outwardly to only thereafter allow the rear face of the spacer to be moved into engagement with the boost unit to assure that the front face is always adjacent the base member of the boot in the establishment of the flow path.

An advantage of a brake system using this invention resides in a communication of air from an engine compartment to a valve through a spacer that off sets a boost unit from a panel that separates the engine compartment from a passenger compartment.

A further advantage of this brake system of this invention is provided through a plurality of tabs that are located within an axial bore of a circular bearing surface that only flex outwardly when a mounting stud enters the axial bore from a rear face to assure that a front face is always positioned adjacent a base member of a boot in the establishment of a flow path between an engine compartment and a bore in a hub that retains a control valve.

BRIEF DESCRIPTION OF DRAWINGS

FIG. 4 is a view of a rear face of the spacer of FIG. 2; and

DETAILED DESCRIPTION

In the specification where similar components are used the component may be identified by a number plus or the same number depending on a need to understand the relationship with other components.

Figure 1:
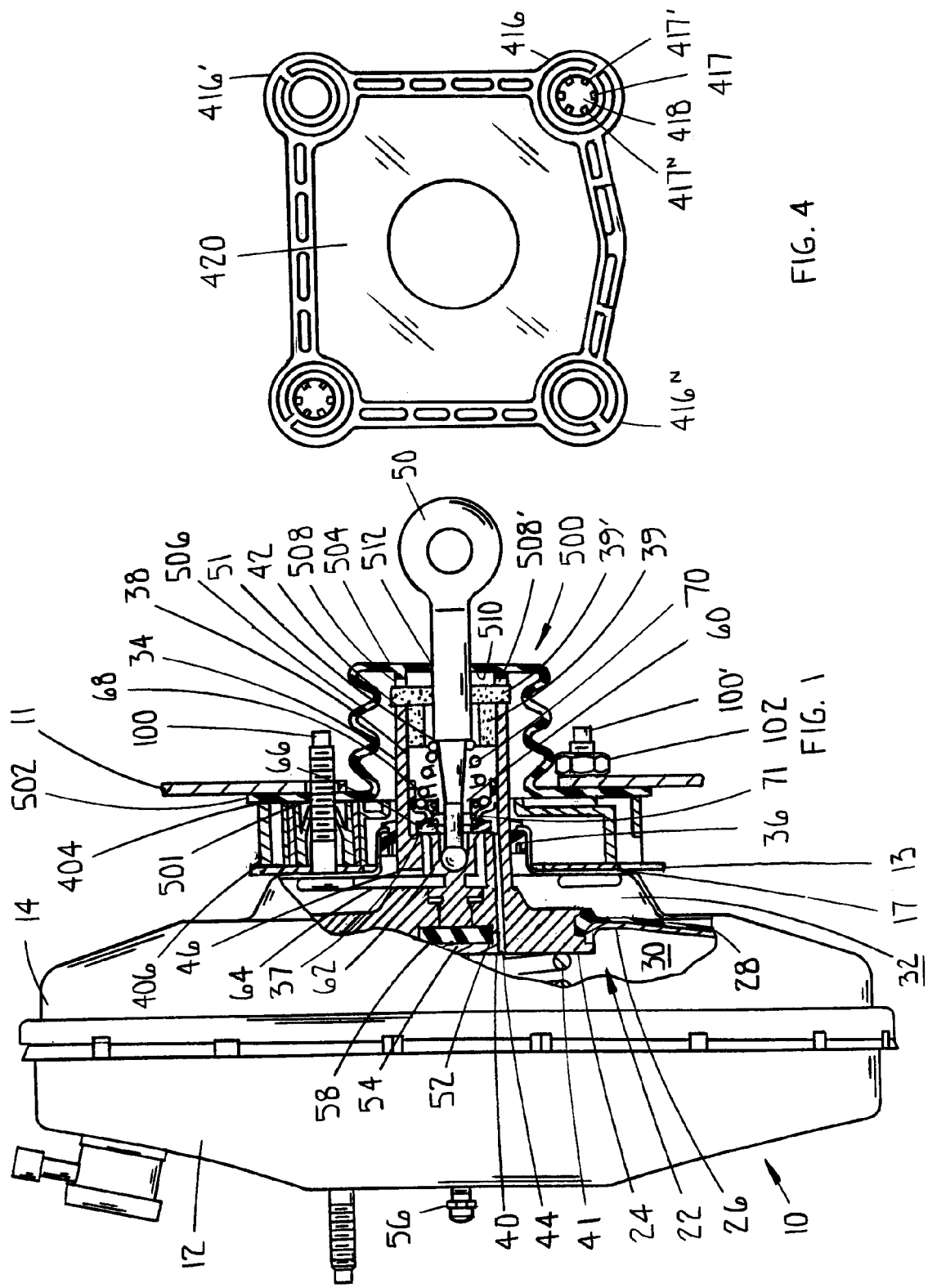
FIG. 1 is a boost unit for a brake system that is offset from a dash panel by a spacer made according to the principals of the present invention.

FIG. 1 provides an illustration of a spacer 400 of the present invention for locating a boost unit 10 an offset distance from a dash panel 11 and into an engine compartment of a vehicle. The boost unit 10 provides a power assist in supplying a master cylinder with an input force to effect a brake application. The boost unit 10 is of a type that functions in a manner as disclosed in U.S. Pat. No. 4,953, 466_Hlt426336126_Hlt426336126.

In more particular detail, the boost unit 10 includes a front shell 12 that is joined to a rear shell 14 to form a unitary structure. A wall 22 that includes a backing plate 26 that is carried on a center hub 24 and held against a shoulder by a diaphragm 28 divides the interior of the unitary structure into a front chamber 30 and a rear chamber 32. A cylindrical projection or valve body 34 that extends from the center hub 24 a through a sealed opening 36 in the rear shell 14 has an axial bore 38 extends from a front face 40 on the central hub 24 to the end 42 of the cylindrical projection 34. The front of the center hub 24 has a face with an annular groove 52 that surrounds a bearing surface that extends inward into the axial bore 38. The central hub 24 has a first passageway 44 that extends from the front face to an annular vacuum seat 37 in the axial bore 38 and a second passageway 46 that extends from the axial bore 38 through the cylindrical projection 34. A head 54 on output push rod 56 that surrounds a reaction disc 58 that is retained in annular groove 52 of the center hub 24. Head 54 communicates an output force, that is developed through movement of the wall 22 by a pressure differential created between chambers 30 and 32, to an output rod 56 that is connected to pistons in the master cylinder. The development of the output force is under the control of a control valve 60 located in bore 38 that responds to an input force applied to push rod 50.

The control valve 60 includes a plunger 62 that is retained in bore 38 by key member 64 and a poppet member 66 that is retained in bore 38 by a retainer. A valve return spring 70 that is caged between the retainer member 68 and a shoulder 51 on push rod 50 urges the plunger 62 toward the poppet member 66 while a poppet spring 71 urges the face on the front of poppet member 66 toward an annular atmospheric seat on the plunger 62.

Figure 2:
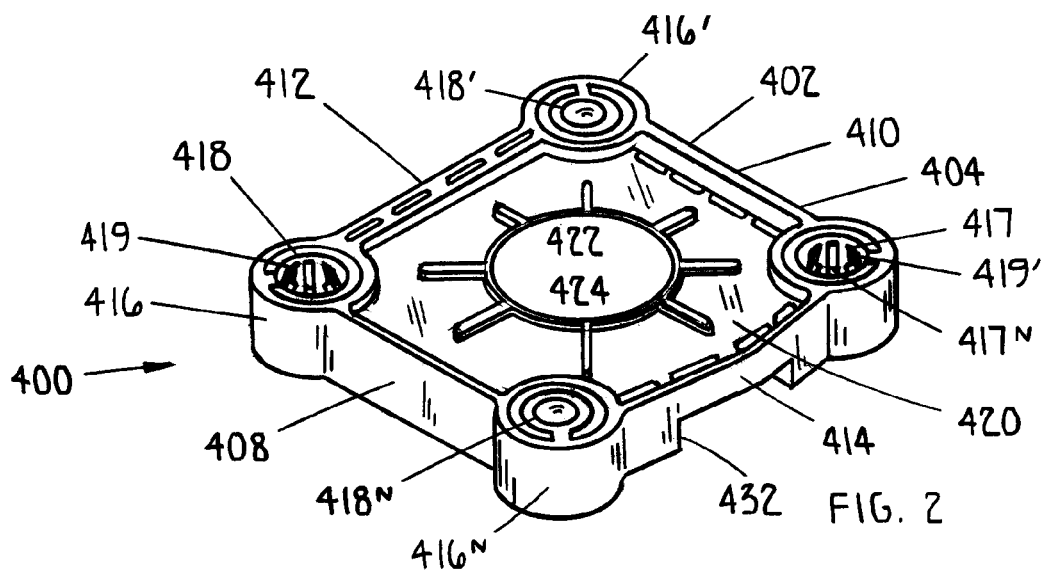
FIG. 2 is a perspective view of the spacer of FIG. 1.
Figure 3:
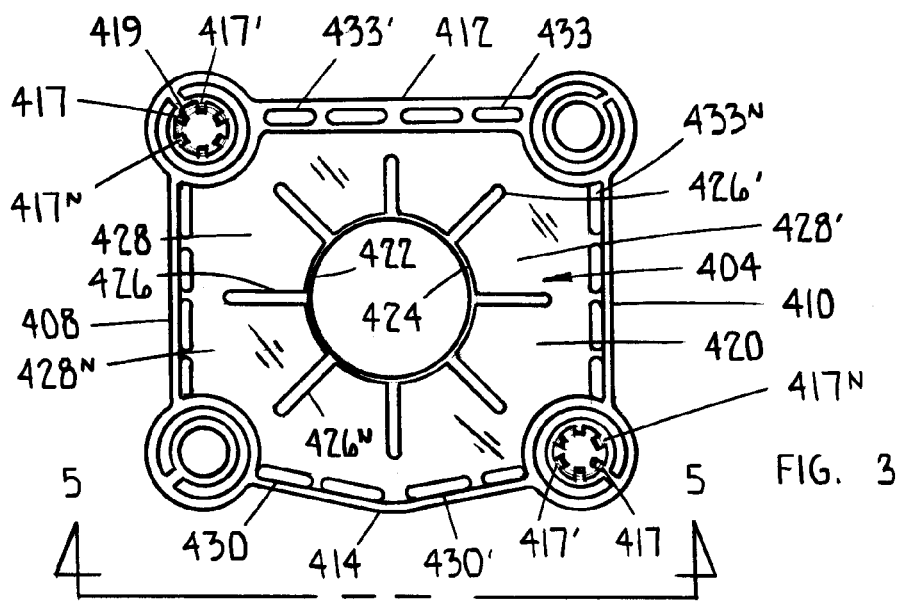
FIG. 3 is view of a front face of the spacer of FIG. 2.
Figure 5:
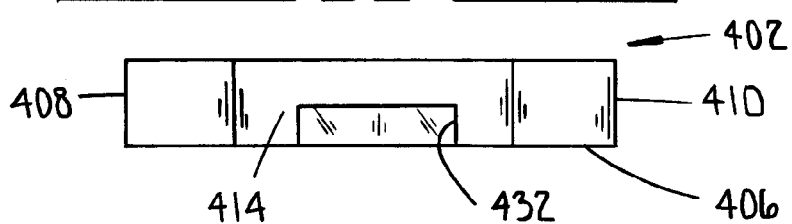
FIG. 5 is a view taken along lines 5—5 of FIG. 3.

A plurality of bolts 100,100' (only two are illustrated but most often four are used) extend from the rear shell 14 of the unitary structure. The bolts 100,100' are used to attach the boost unit 10 to a dash panel 11 of the vehicle. The bolts 100,100' are located in a pattern that matched the axial bores 418, 418' . . . 418$^n$ for bearings surfaces 416, 416' . . . 416$_n$ in spacer 400 as illustrated in FIG. 2. The dash panel 11 divides or separates an engine compartment of the vehicle from the passenger compartment and through the spacer 400 of the present invention the boost unit 10 is off sets into the engine compartment. The off set allows the boost unit 10 to be positioned within the engine compartment and avoid interference with some other components that are located within the engine compartment. In addition any noise that is created during the development of a pressure differential is not heard in a passenger compartment as air that is presented to the boost unit 10 from the engine compartment to operate the boost unit 10 flows along a path through the spacer 400 and a space between a boot 500 and the cylindrical projection 34 of the control valve 60 rather than from the passenger compartment.

The spacer 400 is further illustrated in FIGS. 2,3,4 and 5, and is defined by a body 402 having a front face 404 and a rear face 406 created by a first side 408, a second side 410, a top side 412 and a bottom side 414. The body 402 has a plurality of circular bearing surfaces 416,416" . . . 416$^n$ that are essentially located at an intersection of the sides or corners of the sides. Each of the circular bearing surfaces 416,416" . . . 416$^n$ have a corresponding axial bore 418, 418" . . . 418$^n$ that extends from the front face 404 to the rear face 406 for receiving one of the plurality of mounting bolts 100,100" that extends from the rear shell 14 of the boost unit 10. A solid wall 420 that is located adjacent the front face 404 extends between first side 408, second side 410, top side and 412 and bottom side 414. The wall 420 has an axial opening 422 with a flange 424 that extends to a height that is parallel with the front face 404 and a plurality of ribs 426,426" . . . 426$^n$ that radiate from the flange 424 toward the sides to define a plurality of radial slots 428,428" . . . 428$^n$. The body 402 also has a plurality of axial slots 430,430" that extends from the front face 404 to the rear face 406 along the bottom side 414 and a peripheral slot 432 adjacent the rear wall 406 through which the axial slots 430,430" are connected to the outside of the spacer 400 and when installed the engine compartment.

A least one and if necessary all of the circular bearing surfaces 416,416" . . . 416$^n$ may have a plurality of tabs 417,417" . . . 417$^n$ that are located about mid-way in the axial bore 418 between the front face 404 and the rear face 406. The tip 419 of each of the plurality of tabs 417,417" . . . 417$^n$ is directed toward the axis of the axial bore 418 and front face 404 such that on engaging a mounting stud 100 on the rear shell 14 of the boost unit 10 the plurality of tabs 417,417" . . . 417$^n$ radially flex outwardly to fill the axial bore 418 but are located within the bore 418 such that the tip 419 does not extend past the front face 404.

Sides 408 and 410 and top side 412 of the body 402 are each characterized by parallel walls with successive rectangular openings 433,433" . . . 433$^n$ therein to provide support for retaining the boost unit 10 on the dash panel 11 when a fasteners 102 is are attached to the plurality of mounting studs 100,100".

The boot 500 has a base member 502 that is joined to an end member 504 by an accordion shaped body 506. The base member 502 has a plurality of openings 501,501" . . . 501$^n$ with a same pattern as the plurality of mounting studs 100,100", the accordion shaped body 506 is essentially cylindrical while the end member 504 has flat surface with a plurality of projections 508,508" (only two being illustrated) along an inner face 510 and an axial opening 512.

The input rod 50 extends through and is sealed with respect to axial opening 512 while the projections 508,508" engage the end 42 on cylindrical projection 34 to hold end 504 away from the cylindrical projection 34.

Method of Assembly of Boost Unit onto a Dash Panel

In preparing to attach a boost unit 10 to a dash panel 11, a sub assembly operation is performed by initially attaching a spacer 400 to the boost unit 10 through the following steps.

A boost unit 10 that obtained form a source that is defined by a plurality of mounting studs 100, 100" that are attached to a rear shell 14 and a control valve 60 with a cylindrical projection 34 that extends through sealed opening 36 in the rear shell 14. A thin gasket 13 is placed on the mounting bolts 100,100" and brought into engagement with surface 17 on the rear shell 14. The gasket 13 has a shape that substantially matches the peripheral shape of the spacer 400 with the edges thereof having a greater in width than the sides of the spacer that define a rear face 404 thereof.

A spacer 400 is obtained from a source. The spacer 400 being defined by a body 402 having a plurality of bearing surfaces 416,416" . . . 416$^n$ and corresponding axial bores 418,418" . . . 418$^n$ that extend from a front face 404 to a rear face 406 and a wall 420 that is located between the front face 404 and rear face 406. The wall 420 has an axial opening 422 therein that is surrounded by a flange 424 that extends to a height that is a plane that is parallel with the front face 404 while a plurality of ribs 426,426" . . . 426$^n$ radiate from the flange 424 toward the sides to define a plurality of radial slots 428,428" . . . 428$^n$. The body 402 is further defined by axial slots 430,430" that is located along a bottom side 414 and extend from the front face 404 to the rear face 406 while peripheral slots 432,432" are located in the bottom side 414 adjacent the rear wall 406. The peripheral slots 432,432" provide access through which the axial slots 430,430" and interior of the spacer 400 are connected to the environment on the outside of the spacer 400. At least one of the axial bores 418,418" . . . 418$^n$ is defined by a plurality of tabs 417,417" . . . 417$^n$ that are located about mid-way in an axial bore 418 between the front face 404 and the rear face 406 with the end 419 thereof extending toward the front face 404.

The spacer 400 is aligned with the mounting studs 100, 100" that extend from the shell 14 such that corresponding number of axial bores 418,418" . . . 418$^n$ receive the mounting studs 100,100". The spacer 400 is moved toward the rear shell 14 and when a stud 100 engages the tip 419 of the plurality of tabs 417,417" . . . 417$^n$, the tabs 417,417" . . . 417$^n$ flex outwardly into the axial bore 418 and thereafter allow the rear face 406 of the spacer 400 to be moved into engagement with gasket 13 on surface 17 on the rear shell 14 to assure that the front face 404 is facing outward. Once face 406 on spacer 400 engage the gasket 13, the end tip 419 on each of the plurality of tabs 417,417" . . . 417$^n$ also engage the mounting stud 100 to assist in retaining the spacer 400 on the boost unit 10 during the transfer of the boost unit 10 for installation on the dash panel 11 of a vehicle.

A boot 500 defined by a base member 502 that is joined to an end member 504 by an accordion shaped body 506 with a plurality of projection 508 spaced along an inner face 510. The base member 502 of boot 500 is placed over the plurality of studs 100,100" with the studs 100,100" passing through corresponding openings 501 (only one of which is shown) and brought into engagement with the front face 404 of spacer 400 such that the base member 502 engages the or top of the plurality of radial ribs 426,426" . . . 426$^n$ at a distance from the flange 424 to close the plurality of radial slots 428,428" . . . 428$^n$ and yet define an opening between the flange 424 and the inner annular edge of the base member 502 to provide a passage into the spacer between the annular projection 34 and accordion shaped body 506. Through the engagement of the base member 502 with the top of the radial ribs 426,426" . . . 426$^n$, the base member 502 never engages the wall 420 and as a result the plurality of radial slots 428,428" . . . 428$^n$ remain substantially constant in size. In addition, first side 408, a second side 410, a top side 412 and a bottom side 414 of the spacer 400 are sealed with respect to the rear shell 14 and dash panel 11 such that water and other contaminates carried by air are essentially prevented from being presented to the control valve 60. In addition the arcuate shape of the peripheral slot 432 has a point that is lower than the bottom of the first 408 and second 410 sides of the body 402 of the spacer 400 such that any condensation or water that may accumulate in the interior of spacer 400 will be directed or communicated to the engine compartment area rather than effect the flow of air through the flow path.

The boost unit 10 with the boot 500 located on the studs 100,100' is inserted in an opening in the dash panel 11 such that the boot 500 and projection 34 and located in the passenger compartment.

Fasteners 102 (only one is shown) are attached to the plurality of studs 100,100" to compress the spacer 400 between the dash panel 11 and rear shell 14 by way of the base member 502 of boot 500 and gasket 13 to seal sides 408, 410,412 and 414 from the environment while defining a flow path through the bottom side 414 to the bore 38 of the cylindrical projection 34 of the boost unit 10. Once the fasteners 102 are torqued onto the studs 100,100", the boost unit 10 is fixed to the dash panel 11 to complete the installation in a vehicle.

Mode of Operation of the Invention

The boost unit 10 is located in the engine compartment of a vehicle and chamber 30 within boost unit 10 is connected to the intake manifold of an internal combustion engine through a check valve. When the engine is operating, vacuum is produced at the intake manifold which evacuates air from chambers 30 and 32 such that a return spring 41 located within the boost unit 10 positions wall 22 in a rest position as shown in FIG. 1. When an operator desires to effect a brake application, an input force is applied to pedal which linearly moves push rod 50 causing plunger 42 to move away from an atmospheric seat on poppet member 66 and allow air to flow from the engine compartment into chamber 32 by way of peripheral slots 432,432", axial slots 430,430", radial slots 428,428" . . . 428$^n$, around the end of the accordion shaped body 506 of boot 500 and into the space between the accordion shaped body 506 and cylindrical projection 38, past hold off projections 508 on end 510 of boot 500, through filters 39,39", into bore 38 and out passageway 46 to the rear chamber 32. With air in the rear chamber 32 and vacuum in chamber 30, a pressure differential, corresponding to the input force applied to input member 50 is created across wall 22 to develop an output force which after overcoming the force of return spring 41 is communicated into the output push rod 56 for moving pistons in the master cylinder to effect a brake application.

During a brake application, the flow of air from the engine compartment by way of the flow path created by the relationship between the spacer 400 and boot 500 and cylindrical projection 34 to chamber 32 is essentially unrestricted as the base member 402 engages the top of radial ribs 426,426" ... 426''' such that the radial slots 428,428" ... 428''' remain at a substantially constant size and the projections 508 hold the end 510 of the boot 500 away from the end 42 of the cylindrical projection 34.

The plurality of tabs 417,417' ... 417''' that are located in one or all of the axial bores 418 of the bearing surfaces 416 of the spacer 400 assure that the front face 404 of the spacer 400 is always engaged by the base member 502 of the boot 500 since the spacer 400 is prevented from being placed on the studs 100,100' whereby the rear face 406 would not engage the surface 17 on the rear shell 14. This is achieved in the following manner, when the spacer 400 is placed on the studs 100,100' if the front face 404 is facing toward the rear shell 14, the studs 100,100' engage the tip 419 of the tabs 417,417' ... 417''' and instead of flexing outward, the tabs 417,417' ... 417''' will be directed toward the axis of the axial bore 418 to prevent any further movement of the spacer 400 toward the rear shell 14.

We claim:

1. A brake system having a boost unit that is secured to a panel of a vehicle that separates an engine compartment from a passenger compartment, said boost unit having a housing that retains a valve body with a cylindrical projection that extends through a first opening in said housing into the passenger compartment, a boot located on said panel that extends from said opening and is secured to an input rod, a valve located within a bore of said valve body and responsive to an input force applied to the input rod to selectively communicate air from said engine compartment to a chamber in said boost unit by way of said bore for creating a pressure differential across a movable wall in the boost unit, said pressure differential acting on said movable wall to develop an output force to effect a brake application, said brake system being characterized by a spacer located between said panel and said boost unit for off-setting said boost unit from said panel into said engine compartment; said spacer being defined by a body having a front face and a rear face created by a first side, a second side, a top side, and a bottom side, said body having a plurality of circular bearing surfaces located at an intersection of said sides with an axial bore that extends through each bearing surface for receiving a mounting bolt that extends from said boost unit, a plurality of tabs that are located in said axial bore and directed toward the axis of said axial bore and said front face; and a wall located adjacent said front face that extends between said first side, said second side, said top side, and said bottom side, said wall having a second axial opening with a flange that extends to a height that is parallel with said front face and a plurality of ribs that extend from said flange toward said sides to define a plurality of radial slots, said body having an axial slot that extend from said front face to said rear face and a peripheral slot adjacent said rear wall through which said axial slot is connected to said engine compartment, said tabs on said body on engaging a corresponding mounting stud on said boost unit radially flexing outwardly to only thereafter allow said rear face of said spacer to be moved into engagement with said housing of said boost unit, each of said plurality of tabs being located in an axial bore at a point that is mid-way between said front face and said rear face and in radially flexing outwardly never extend past said front face, said plurality of tabs engaging a corresponding mounting stud to retain said spacer on said boost unit prior to the attachment of fasteners on said mounting studs, said boot being defined by a base member that is joined to an end member by an accordion shaped body, said accordion shaped body surrounding said cylindrical projection of said valve body while said input rod extends through and is sealed with respect to said end member, said base member engaging said front face of said spacer and being compressed by said first side, second side, said top side and said bottom side of said spacer body when fasteners are connected to the mounting bolts such that unrestricted communication of air from the engine compartment to said bore of said valve body occurs along a flow path defined by said peripheral slot, axial slot, plurality of radial slots in the spacer and an axial space between said accordion shaped body of said boot and said cylindrical projection of said valve body, said plurality of tabs assure that said front face is adjacent said base member of said boot in the establishment of said flow paths while said plurality of radial ribs prevent said base member of said boot from engaging said wall to assure said flow path remains a substantially same size during the communication of air from the engine compartment to said bore of said valve body, said first side, said second side and said top side being further characterized by parallel walls with successive rectangular openings therein to provide support for retaining said boost unit on said panel when said fasteners are attached to said mounting studs and wherein said bottom side is arcuate such that said peripheral slot has a point that is lower than the first and second sides of said body of said spacer to allow any water that may be present in said spacer to be communicated to said engine compartment area rather than effect the flow of air through the flow path.

2. The brake system as recited in claim 1 wherein said plurality of radial ribs prevent said base member of said boot from engaging said wall to assure said flow path remains a substantially same size during the communication of air from the engine compartment to said bore of said valve body.

3. A brake system having a boost unit that is secured to a panel of a vehicle that separates an engine compartment from a passenger compartment, said boost unit having a housing that retains a valve body with a cylindrical projection that extends through a first opening in said housing into the passenger compartment, a boot located on said panel that extends from said opening and is secured to an input rod, a valve located within a bore of said valve body that is responsive to an input force applied to the input rod to selectively communicate air from said engine compartment to a chamber in said boost unit by way of said bore for creating a pressure differential across a movable wall in the boost unit, said pressure differential acting on said movable wall to develop an output force to effect a brake application, said brake system being characterized by a spacer located between said panel and said boost unit for off-setting said boost unit from said panel into said engine compartment, said spacer being defined by a body having a front face and a rear face created by a first side, a second side, a top side, and a bottom side, said body having a plurality of circular bearing surfaces located at an intersection of said sides with an axial bore that extends through each bearing surface for receiving a mounting bolt that extends from said boost unit, a plurality of tabs that are located in said axial bore and directed toward the axis of said axial bore and said front face; and a wall located adjacent said front face that extends between said first side, said second side, said top side, and said bottom side, said wall having a second axial opening with a flange that extends to a height that is parallel with said front face and a plurality of ribs that extend from said flange toward said sides to define a plurality of radial slots, said body having an axial slot that extend from said front face to said rear face and a peripheral slot adjacent said rear wall through which said axial slot is connected to said engine compartment, said tabs on said body on engaging a corresponding mounting stud on said boost unit radially flexing outwardly to only then thereafter allow said rear face of said spacer to be moved into engagement with said housing of said boost unit, said boot being defined by a base member that is joined to an end member by an accordion shaped body, said accordion shaped body surrounding said cylindrical projection of said valve body while said input rod extends through and is sealed with respect to said end member, said base member engaging said front face of said spacer and being compressed by said first side, second side, said top side and said bottom side of said spacer body when fasteners are connected to the mounting bolts such that communication of air from the engine compartment to said bore of said valve body occurs along a flow path defined by said peripheral slot, axial slot, plurality of radial slots in the spacer and an axial space between said accordion shaped body of said boot and said cylindrical projection of said valve body to assure that said front face is adjacent said base member of said boot in the establishment of said flow paths, said plurality of radial ribs on said wall preventing said base member of said boot from engaging said wall to assure said flow path defined by said plurality of radial slots remains a substantially same size during the communication of air from the engine compartment to said bore of said valve body.

4. The brake system as recited in claim 3 wherein said first side, said second side and said top side are further characterized by parallel walls with successive rectangular openings to provide support for retaining said boost unit on said panel when said fasteners are attached to said mounting studs.

5. The brake system as recited in claim 4 wherein said bottom side is arcuate and said peripheral slot has a point that is lower than the first and second sides of said body of said spacer to allow any water that may be present in said spacer to be communicated to said engine compartment area rather than effect the flow of air through the flow path.

* * * * *